(12) United States Patent
Bergquist et al.

(10) Patent No.: US 10,342,063 B2
(45) Date of Patent: Jul. 2, 2019

(54) ACTIVATION OF DRX PARAMETERS

(71) Applicant: Telefonaktiebolaget LM Ericsson (publ), Stockholm (SE)

(72) Inventors: Gunnar Bergquist, Kista (SE); Patrick Lie Chin Cheong, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 15/122,450

(22) PCT Filed: May 17, 2016

(86) PCT No.: PCT/SE2016/050441
§ 371 (c)(1),
(2) Date: Aug. 30, 2016

(87) PCT Pub. No.: WO2016/186555
PCT Pub. Date: Nov. 24, 2016

(65) Prior Publication Data
US 2017/0156176 A1 Jun. 1, 2017

Related U.S. Application Data

(60) Provisional application No. 62/163,472, filed on May 19, 2015.

(51) Int. Cl.
*G08C 17/00* (2006.01)
*H04W 76/28* (2018.01)
(Continued)

(52) U.S. Cl.
CPC ............ *H04W 76/28* (2018.02); *H04W 8/22* (2013.01); *H04W 52/0216* (2013.01);
(Continued)

(58) Field of Classification Search
CPC ... H04W 76/28; H04W 8/22; H04W 52/0216; Y02D 70/146; Y02D 70/142; Y02D 70/24; Y02D 70/1262; Y02D 70/00
(Continued)

(56) References Cited

U.S. PATENT DOCUMENTS 9,532,308 B2 * 12/2016 Han ................. H04W 52/0216
2010/0118815 A1 5/2010 Kim et al.
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 12)", Technical Specification, 3GPP TS 36.321 V12.0.0, Dec. 1, 2013, pp. 1-57, 3GPP, France.
(Continued)

*Primary Examiner* — Chuong T Ho
(74) *Attorney, Agent, or Firm* — Sage Patent Group

(57) ABSTRACT

Methods and apparatus are described of changing the discontinuous reception (DRX) configuration for a connection between a mobile device (50) and a base station (20) that reduces the likelihood of a dropped connection. A mobile device (50) receives updated configuration parameters for the connection from a base station. A mobile device (50) receives updated configuration parameters for the connection from a base station (20). The mobile device (50) postpones the adoption of the new configuration parameters and continues using previous configuration parameters for the connection after receipt of the new configuration parameters until a subsequent on duration of a DRX cycle has occurred according to the previous configuration. The mobile device (50) applies the updated configuration parameters for the connection in the subsequent on duration. Thereafter, the mobile device (50) turns its receiver on and off in DRX mode according to the new DRX configuration.

26 Claims, 14 Drawing Sheets

(51) Int. Cl.
*H04W 52/02* (2009.01)
*H04W 8/22* (2009.01)
(52) U.S. Cl.
CPC .......... *Y02D 70/00* (2018.01); *Y02D 70/1262* (2018.01); *Y02D 70/142* (2018.01); *Y02D 70/146* (2018.01); *Y02D 70/24* (2018.01)
(58) Field of Classification Search
USPC .......................... 370/311, 329, 330, 252, 254
See application file for complete search history.

(56) References Cited

U.S. PATENT DOCUMENTS

| | | | |
|---|---|---|---|
| 2013/0235780 A1* | 9/2013 | Kim | H04W 52/0216 370/311 |
| 2013/0265928 A1* | 10/2013 | Martinez Tarradell | H04W 72/0413 370/312 |
| 2014/0018085 A1* | 1/2014 | Young | H04W 52/0235 455/450 |
| 2014/0269480 A1* | 9/2014 | Han | H04W 52/0216 370/311 |
| 2015/0085712 A1 | 3/2015 | Wang et al. | |
| 2016/0037452 A1* | 2/2016 | Kim | H04W 52/0258 370/311 |
| 2016/0143048 A1* | 5/2016 | Lee | H04W 24/08 370/336 |
| 2017/0295546 A1* | 10/2017 | Young | H04W 52/0235 |

OTHER PUBLICATIONS

3rd Generation Partnership Project,"3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.0.0, Dec. 1, 2013, pp. 1-349, 3GPP, France.

* cited by examiner

ACTIVATION OF DRX PARAMETERS

RELATED APPLICATIONS

This application claims priority to U.S. Provisional Patent Application Ser. No. 62/163,472 filed May 19, 2015, the entire contents of which are incorporated herein by reference.

TECHNICAL FIELD

The present disclosure relates generally to discontinuous reception in a wireless communication network and, more particularly, to methods and apparatus for modifying and activating DRX parameters.

BACKGROUND

Discontinuous reception (DRX) is a technique used in wireless communication networks to conserve the battery power of mobile devices. Because data traffic in wireless communication networks is often bursty, with short periods of activity followed by long periods of inactivity, the mobile device may turn its receiver off to conserve battery power during periods of inactivity and turn its receiver on at periodic intervals to monitor the Physical Downlink Control Channel (PDCCH) for uplink grants and downlink transmissions. DRX can result in significant power savings for the mobile device and thus longer battery life.

The network may configure a dedicated connection for a mobile device to employ DRX depending on the capabilities of the mobile device and power preferences. A number of configuration parameters, referred to herein as DRX parameters, are used to configure DRX operation. The DRX parameters, among other things, define a DRX cycle for use when a mobile device is in DRX mode, In Long Term Evolution (LTE), both a short DRX cycle and long DRX cycle may be defined. The parameters shortDRX-Cycle and longDRX-Cycle define the length in subframes of the short and long DRX cycles respectively. The onDuration parameter specifies the number of PDCCH subframes at the beginning of each DRX cycle that the receiver in the mobile device is turned on to monitor the PDCCH (the DRX on duration) before the receiver is turned off. The same onDuration parameter is typically used for both short and long DRX cycles. Other important DRX parameters defined in LTE include drxStartOffset that specifies the PDCCH subframe at which the DRX cycle starts, drx-Inactivity-Timer that specifies the number of consecutive PDCCH subframes that the mobile device should remain active after successfully decoding a PDCCH indicating a new uplink (UL) of downlink (DL) transmission, and drx-Retransmission Timer that specifies the maximum number of consecutive PDCCH-subframes that the mobile device should monitor when a retransmission on the downlink is expected by the mobile device.

There is no single DRX configuration that is ideal for all services. Therefore, the network may desire to change the DRX configuration depending on the services that the mobile device is receiving to improve network performance and/or user experience. To change the DRX configuration, the network sends the new DRX parameters to the mobile device in a radio resource control (RRC) message. The mobile device applies the new DRX parameters and sends a response message to the network indicating that the reconfiguration is complete, at which time the network applies the new DRX parameters. Thus, changing the DRX configuration while the mobile device is connected can result in a connection failure if the mobile device commits to a new DRX configuration but there is a delay in sending the response message from the mobile device.

SUMMARY

One aspect of the present disclosure comprises techniques and protocols for changing the discontinuous reception (DRX) configuration for a connection between a mobile device and a base station that reduces the likelihood of a failed connection. The base station or other network node sends a control message containing an updated DRX configuration with new DRX parameters to the mobile device. The mobile device receives the control message containing the updated configuration parameters for the connection from a base station and sends an acknowledgment to the base station or other network node responsive to the control message. The mobile device continues using the current DRX configuration for the connection after receipt of the updated DRX configuration until a predetermined event has occurred. Responsive to the predetermined event, the mobile device applies the updated DRX configuration. On the network side, the base station receives the acknowledgment from the mobile device. The base station continues using the current DRX configuration for the connection after receipt of the updated DRX configuration until the predetermined event has occurred. Responsive to the predetermined event, the base station applies the updated DRX configuration.

Exemplary embodiments of the disclosure comprise methods implemented by a mobile device of changing the discontinuous reception (DRX) configuration for a connection between a mobile device and a base station. In one embodiment of the method, the mobile device receives, from the base station, a control message indicating updated configuration parameters for the connection with the base station. The mobile device sends an acknowledgement of the control message and continues to use a current DRX configuration for the connection after receipt of the control message until a subsequent on duration of a DRX cycle according to the previous configuration parameters has occurred. The mobile device applies the updated configuration parameters for the connection in the subsequent on duration.

Other embodiments of the disclosure comprise a mobile device capable of changing the discontinuous reception (DRX) configuration for a connection between a mobile device and a base station. One embodiment of the mobile device comprises an interface circuit including a receiver for communicating with a serving base station over a wireless communication channel and a processing circuit operatively connected to the interface circuit. The processing circuit is configured to receive, from the base station, a control message indicating updated configuration parameters for the connection with the base station. The processing circuit is further configured to send an acknowledgement of the control message, continue using the a current DRX configuration for the connection after receipt of the control message until a subsequent on duration of a DRX cycle according to the current DRX configuration has occurred, and apply the updated configuration parameters for the connection in the subsequent on duration of the DRX cycle.

Other embodiments of the disclosure comprise methods implemented by a base station of changing the discontinuous reception (DRX) configuration for a connection between a mobile device and the base station. In one embodiment of the method, the base station sends a control message indicating updated configuration parameters for the connection with the mobile device and receives an acknowledgement of the control message from the mobile device responsive to the control message. The base station continues using a current DRX configuration for the connection after receipt of the acknowledgement until a subsequent on duration of a DRX cycle according to the current DRX configuration has occurred and applies the updated configuration parameters for the connection in the subsequent on duration of the DRX cycle.

Other embodiments of the disclosure comprise a base station capable of changing the discontinuous reception (DRX) configuration for a connection between a mobile device and the base station. One embodiment of the base station comprises an interface circuit for communicating with a mobile device over a wireless communication channel and a processing circuit operatively connected to the interface circuit. The processing circuit is configured to send a control message indicating updated configuration parameters for the connection with the mobile device and receive an acknowledgement of the control message from the mobile device responsive to the control message. The processing circuit is further configured to continue using a current DRX configuration for the connection after receipt of the acknowledgement until a subsequent on duration of a DRX cycle according to the current DRX configuration has occurred, and apply the updated configuration parameters for the connection in the subsequent on duration of the DRX cycle.

Other embodiments of the disclosure comprise a non-transitory computer readable medium storing executable program code that when executed by a processing circuit in a mobile device causes the mobile device to receive, from the base station, a control message indicating updated configuration parameters for the connection with the base station; send an acknowledgement of the control message; continue to use a current DRX configuration for the connection after receipt of the control message until a subsequent on duration of a DRX cycle according to the current DRX configuration has occurred; apply the updated configuration parameters for the connection in the subsequent on duration of the DRX cycle.

Other embodiments of the disclosure comprise a non-transitory computer readable medium storing executable program code that when executed by a processing circuit in a base station causes the base station to send a control message indicating updated configuration parameters for the connection with the mobile device; receive an acknowledgement of the control message from the mobile device responsive to the control message; continue to use current DRX configuration for the connection after receipt of the acknowledgment until a subsequent on duration of the DRX cycle according to the current DRX configuration has occurred; and apply the updated configuration parameters for the connection in the subsequent on duration of the DRX cycle

DETAILED DESCRIPTION

Figure 1:
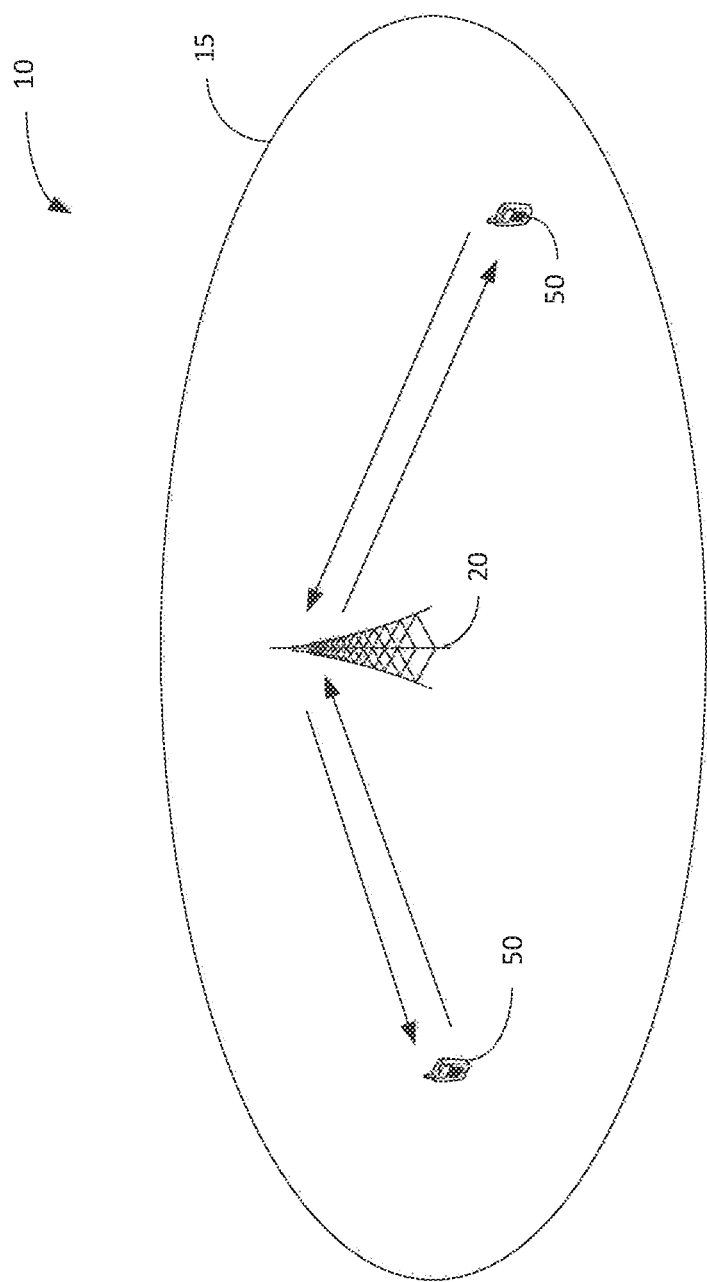
FIG. 1 illustrates a communication network configured to implement DRX activation techniques as herein described.

Referring now to the drawings, FIG. 1 illustrates a wireless communication network 10. The communication network 10 comprises a plurality of cells 15, though only one cell 15 is shown in FIG. 1. A base station 20 within each cell 15 communicates with mobile devices 50 within the cell 15. The base station 20 transmits data to the mobile devices 50 within the cell 15 over a downlink channel for downlink communications, and receives data from the mobile devices 50 over an uplink channel for uplink communications. The communication network 10 is configured to enable discontinuous reception (DRX) as hereinafter described.

For illustrative purposes, an exemplary embodiment of the present disclosure will be described in the context of a Long Term Evolution (LTE) system. In LTE, the base station 20 is referred to as an Evolved Node B (eNB) and the mobile device 50 is referred to as a user equipment (UE). Those skilled in the art will appreciate, however, that the present disclosure is more generally applicable to wireless communication networks that employ discontinuous reception (DRX). For example, the techniques described herein may be adapted by a skilled practitioner for Wideband Code Division Multiple Access (WCDMA) networks, Worldwide Interoperability for Microwave Access (WiMAX) networks, and other networks implementing DRX.

Figure 2:
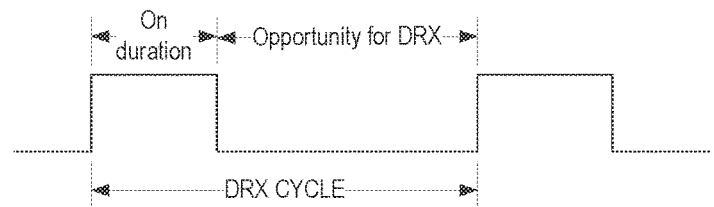
FIG. 2 illustrates an exemplary DRX cycle.

LTE supports DRX in the downlink to conserve the battery power of mobile devices. FIG. 2 illustrates a DRX cycle used in DRX mode. The DRX cycle includes a DRX on duration when the receiver in the mobile device 50 is turned on to monitor the Physical Downlink Control Channel (PDCCH) and a DRX off duration when the receiver may be turned off to conserve power. The network 10 sends control messages related to uplink and downlink transmissions to the mobile device 50 during the DRX on duration. If, during the DRX on duration, the mobile device 50 receives a control message related to an uplink or downlink transmission for the mobile device 50, the mobile device 50 switches from the DRX mode to a continuous reception mode and starts a DRX inactivity timer (DIAT). During the continuous reception mode, the mobile device 50 monitors each PDCCH subframe and restarts the DIAT if it receives another control message while the DIAT is still running. When the DIAT expires, the mobile device 50 returns to DRX mode. Typically, the DRX configuration includes a short DRX cycle and long DRX cycle. When the mobile device 50 switches from continuous reception mode to DRX mode, it switches to the DRX short cycle for a predetermined number of cycles and then to the DRX long cycle.

The base station 20 specifies the DRX configuration for the connection with the mobile device 50. The DRX parameters used to configure DRX operation include:

the shortDRX-Cycle that specifies length of the short DRX cycle in subframes the drxShortCycleTimer that specifies the number of short DRX cycles required before switching to the long DRX cycle the longDRX-CycleStartOffset that specifies the long DRX cycle as a multiple of short DRX cycles and the DRX offset. The DRX offset is used to calculate the starting subframe number for DRX cycles.

the onDurationTimer that specifies the number of consecutive PDCCH-subframes at the beginning of each DRX Cycle that the receiver is turned on to monitor the PDCCH, i.e., the DRX on duration.

the drx-Retransmission Timer that specifies the maximum number of subframes that the mobile device 50 should monitor PDCCH when a retransmission from the base station 20 is expected.

The DRX parameters are typically sent to the mobile device 50 in a Radio Resource Control (RRC) message by including a DRX-Config structure that contains the DRX parameters in the RRC message. The DRX-Config structure is included in the MAC-MainConfig Information Element (IE) of the RRC message.

The DRX configuration can be optimized to either maximize power savings or minimize latency depending on the services being provided to the mobile device 50. For example, a DRX configuration that maximizes power saving may be preferable for applications such as web browsing and instant messaging while a DRX configuration that minimizes latency may be preferable for delay sensitive applications such as video streaming and gaming. For some applications, a DRX configuration that balances the trade-off between power saving and latency may be preferred.

Figure 3:
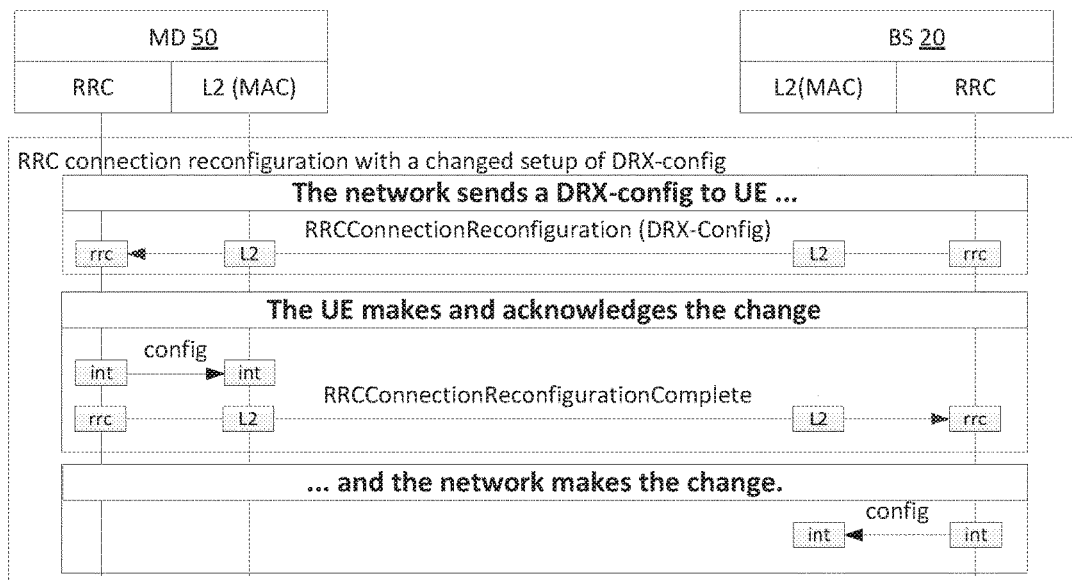
FIG. 3 illustrates a procedure for changing the DRX configuration for a connection between a mobile device and a base station.

The base station 20 may change the DRX configuration when a mobile device 50 indicates a change in power preferences, or when there is a change in the services provided to the mobile device 50. FIG. 3 illustrates an exemplary procedure for changing the DRX configuration for a connection with the mobile device 50. The base station 20 initiates the change by sending the new DRX configuration to the mobile device 50 in a RRCConnectionReconfiguration (RCR) message. As previously noted, the new DRX parameters are specified by the DRX-Config structure contained in the MAC-MainConfig IE of the RCR message. The RCR message containing the new DRX parameters is delivered by the RRC layer to the Medium Access Control (MAC) layer, denoted as L2 in FIG. 3, and transmitted over the physical layer to the mobile device 50.

Upon receipt by the mobile device 50, the MAC layer at the mobile device 50 delivers the RCR message to the RRC layer in the mobile device 50. The RRC layer performs a RRC reconfiguration procedure and configures the MAC layer in accordance with the MAC-MainConfig IE, which includes the new DRX parameters. When a reconfiguration is requested by the RRC layer, the MAC layer 1) applies new timer values when the timers are restarted, 2) applies new maximum values for counters when the counters are initialized, and 3) applies all other parameters immediately. When the RRC reconfiguration procedure is complete, the RRC layer in the mobile device 50 submits a RRCConnectionReconfigurationComplete (RCRC) message to the MAC layer for transmission to the base station 20 over the physical layer. Upon receipt of the RCRC message, the base station 20 applies the new DRX parameters.

As is apparent from FIG. 3, the new DRX configuration is applied by the mobile device 50 before the RCRC message is transmitted to the base station 20. Delays in transmitting the RCRC message from the mobile device 50 after the reconfiguration and/or delays in receiving the RCRC at the base station 20 may cause loss of synchronization and link problems.

Figure 4:
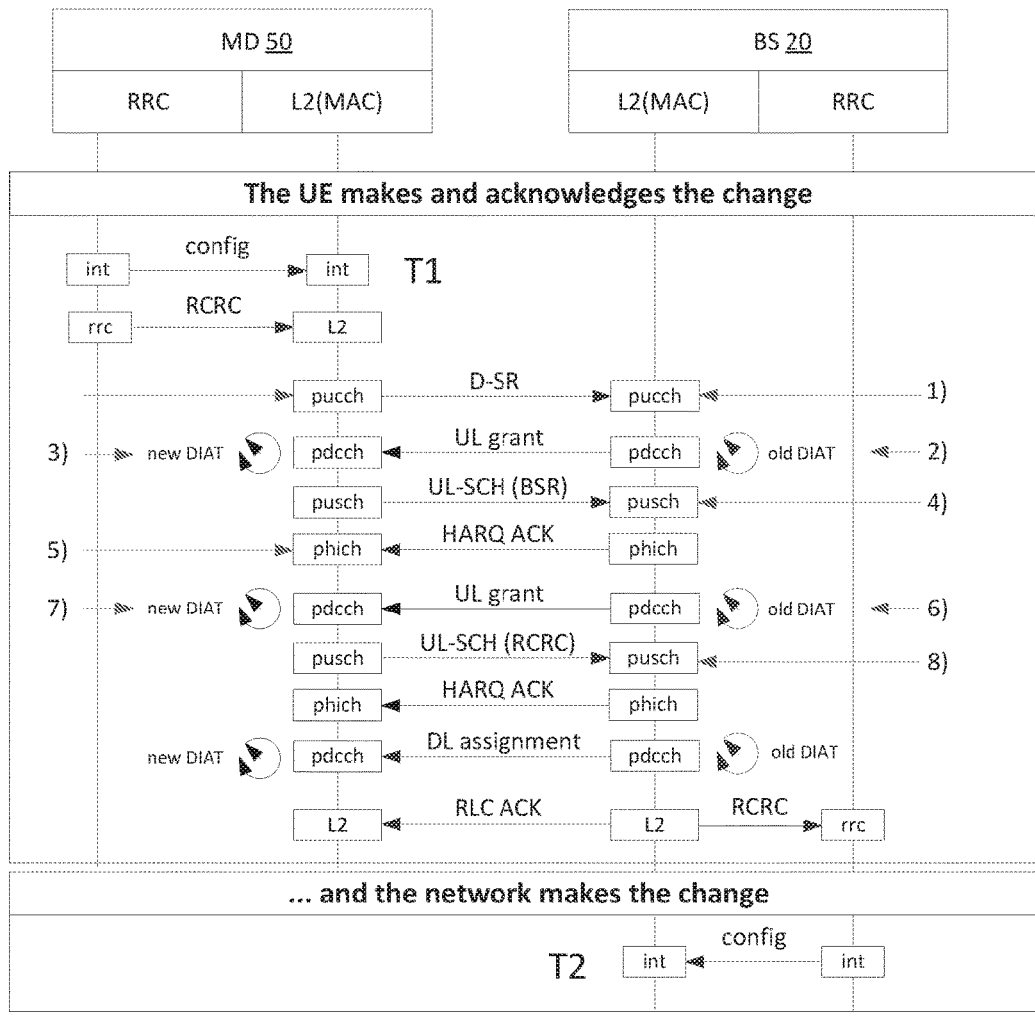
FIG. 4 illustrates a more detailed procedure for changing the DRX configuration for a connection between a mobile device and a base station.

FIG. 4 illustrates an exemplary procedure for changing the DRX configuration in more detail to show how reconfiguration may lead to loss of synchronization. The procedure shown in FIG. 4 begins after the mobile device 50 receives a RCR message from the base station 20. The RRC layer performs a RRC reconfiguration procedure, configures the MAC layer in accordance with the MAC-MainConfig IE as previously described, and submits the RCRC message to the MAC layer for transmission to the base station 20. The MAC layer in the mobile device 50 sends a dedicated scheduling request (D-SR) to its peer in the base station 20 on the Physical Uplink Control Channel (PUCCH) to request resources for transmitting the RCRC message. After transmitting the D-SR to the base station 20, the mobile device 50 remains DRX Active, i.e., continuously receiving, while the scheduling request is pending, i.e. until the mobile device 50 receives an uplink grant for the Physical Uplink Shared Channel (PUSCH). The base station 20 sends an uplink (UL) grant to the mobile device 50 on the Physical Downlink Control Channel (PDCCH) and starts the DIAT timer. Because the base station 20 has not yet received the RCRC message, it uses the old DIAT timer value. Upon receipt of the UL grant, the mobile device 50 starts the DIAT to further prolong the active time. The mobile device 50, however, uses the new DIAT value.

The mobile device 50 uses the UL grant from the base station 20 in accordance with standardized priorities and logical channel prioritization. The mobile device 50 sends a Buffer Status Report (BSR) that describes the size of each buffer in the mobile device 50 and which has highest the priority. According to the Hybrid Automatic Repeat Request (HARQ) protocol implemented at the MAC layer, the base station 20 acknowledges the uplink transmission received on PUSCH by sending an Acknowledgement (ACK) message on the Physical HARQ Indicator Channel (PHICH), sends another UL grant on the PDCCH based on the BSR, and starts or restarts the DIAT using the old DIAT timer value. When the mobile device 50 receives the second UL grant, it starts or restarts the DIAT using the new DIAT timer value. The size of the UL grant is now large enough for the mobile device 50 to transmit the RCRC.

The mobile device 50 sends the RCRC message to the base station 20 on the PUSCH. Upon receipt of the RCRC, the base station 20 acknowledges receipt of the uplink transmission on the PUSCH by sending an acknowledgment (ACK) message on the Physical HARQ Indicator Channel (PHICH). The MAC layer at the base station 20 also allocates resources on the PDCCH to transmit a RLC Acknowledgement (RLC ACK) to the mobile device 50 to acknowledge the RCRC message and, for that purpose, sends a downlink (DL) assignment message to the mobile device 50 on the Physical Downlink Control Channel (PDCCH). The base station 20 starts or restarts the DIAT using the old DIAT timer value when the DL Assignment message is sent. The base station 20 then sends the RLC ACK to the mobile device 50 on the allocated PDCCH resources and delivers the RCRC message to the RRC layer at the base station 20. The RRC layer then configures the MAC layer to use the new DRX parameters. Upon receipt of the DL assignment message, the mobile device 50 starts or restarts the DIAT and listens for the RLC ACK on the PDCCH. The mobile device 50 commits to the new DRX configuration at time T1, while the base station 20 commits to the new DRX configuration at time T2.

In the sequence of events shown in FIG. 4, there are numerous opportunities for miscommunication that could delay the transmission of the RCRC by the mobile device 50. Possible miscommunications, which are labeled 1-8 in FIG. 4, include:

1) When sending the D-SR, the mobile device 50 exhausts a maximum number of transmission attempts (dsrTransMax) and the network 10 does not receive the D-SR.

2) The base station 20 delays sending a UL grant responsive to the D-SR because there are other higher priority users of the PUSCH resource or PDCCH resources required to send the UL grant.

3) The UL grant is not correctly received and decoded by the mobile device 50.

4) The transmission of the BSR on the PUSCH is not correctly received and decoded by the base station 20.

5) The HARQ ACK is not correctly received and decoded by the mobile device 50.

6) The base station 20 delays sending a UL grant responsive to the BSR because there are other higher priority users of the PUSCH resource or the PDCCH resource required to send the UL grant.

7) The UL grant is not correctly received and decoded by the mobile device 50.

8) The transmission of the RCRC by the mobile device 50 on PUSCH is not correctly received and decoded by the base station 20.

One potential problem resulting from delay in sending the RCRC is that the DIATs and other DRX parameters used at the mobile device 50 and base station 20 are not the same. As shown in FIG. 4, the mobile device 50 starts (or restarts) the DIAT using the new DIAT timer value each time the PDCCH indicates a new transmission (DL or UL). However, the base station 20 is still using the old DIAT timer value because it is still waiting for the RCRC from the mobile device 50 to commit to the new DRX configuration. The DIAT at the mobile device 50 may expire at any time during the sequence of events. When it does, the mobile device 50 will enter the DRX mode and use the new DRX cycle period and on duration, which may different than the DRX cycle and on duration used on the network side. The lack of synchronization may cause irreparable failure of the connection.

Figure 5:
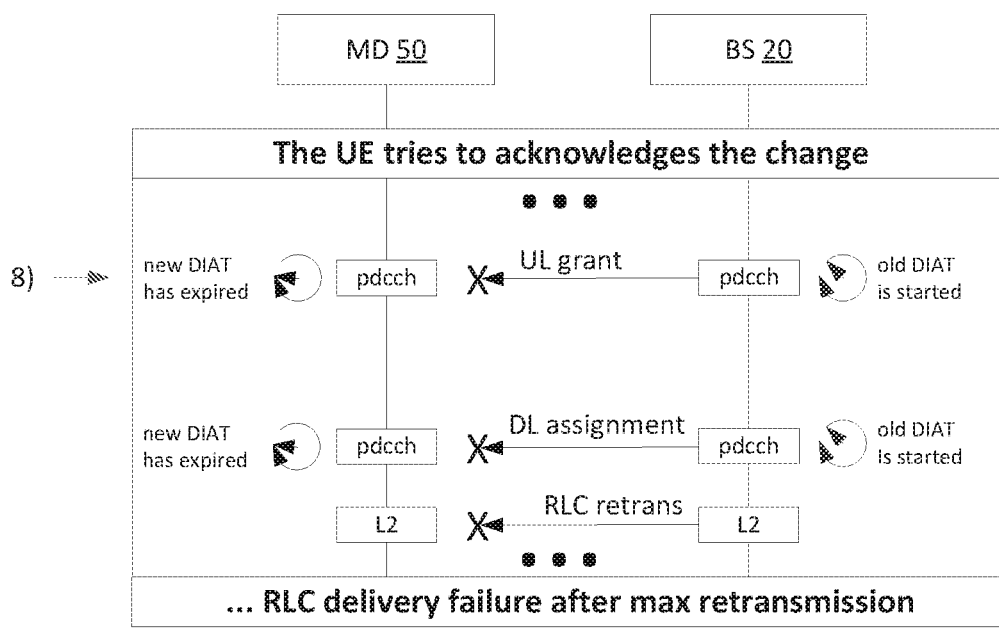
FIG. 5 illustrates an example of a connection failure due to miscommunication between a mobile device and a base station.

FIG. 5 illustrates an example of a connection failure. In this example, it is assumed that the DIAT at the mobile device 50 expires before the base station 20 sends a UL grant responsive to the BSR. If the mobile device 50 has its receiver turned off, it will not receive the UL grant and therefore not transmit the RCRC. Subsequent scheduling grants (UL or DL) may be transmitted by the base station 20 while the receiver at the mobile device 50 is turned off. The end result is an inability to communicate with the mobile device 50 resulting in a connection failure.

One aspect of the present disclosure comprises techniques for changing and activating new DRX parameters in a manner that reduces the likelihood of dropping a connection. When the mobile device 50 receives updated DRX parameters from the base station 20, the mobile device 50 postpones activation of the new DRX parameters and continues using the previous DRX parameters for the connection after receipt of the updated configuration parameters until a subsequent on duration of a DRX cycle has occurred according to the previous DRX parameters. In one embodiment, the mobile device 50 applies the updated DRX parameters at the first subframe of the next DRX on duration according to the previous DRX configuration. In other embodiments, the mobile device 50 waits for the occurrence of a predetermined event and then applies the updated DRX parameters at the first subframe of the next DRX on duration according to the previous DRX parameters after the predetermined event. The predetermined event may, for example, comprise the expiration of a Time Alignment Timer (TAT) if the UL transmission of the mobile device 50 is synchronized with the base station 20. The predetermined event may also comprise a successful resynchronization by random access (RA) if the UL transmission of the mobile device 50 is not synchronized with the base station 20.

Figure 6:
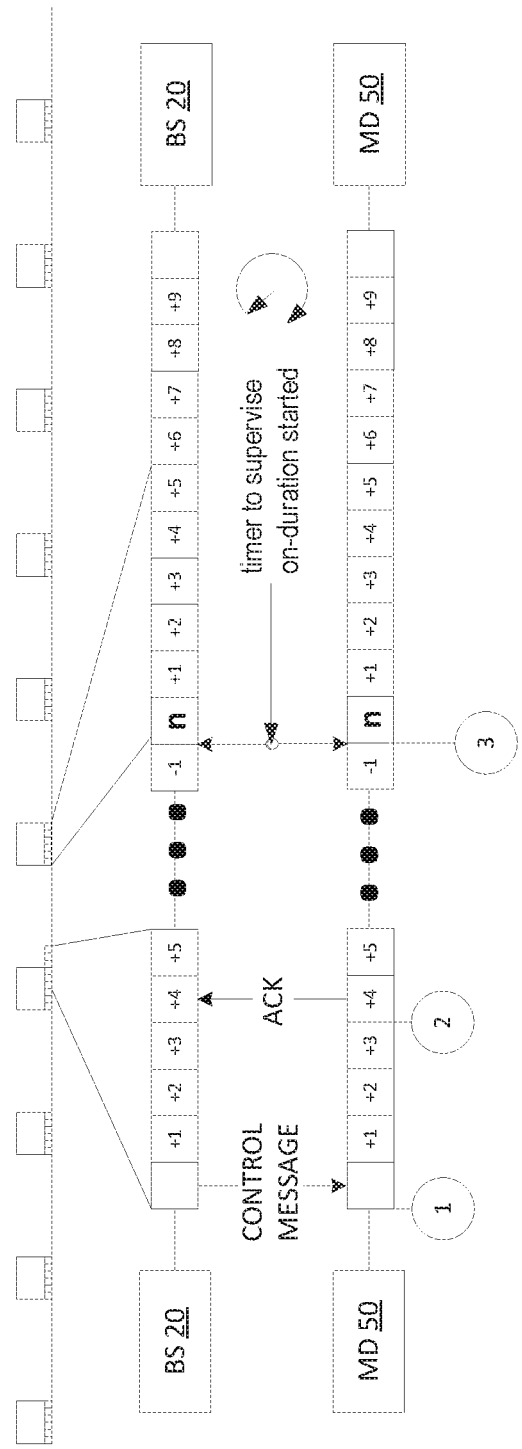
FIG. 6 is a timing diagram illustrating an exemplary method for changing DRX parameters according to a first embodiment.

FIG. 6 is a timing diagram illustrating a first exemplary method for changing DRX parameters. It is assumed that the mobile device 50 is capable of operating in DRX mode and has previously received a control message containing a DRX configuration for use by the mobile device 50. At some point, the network 10 decides to update the DRX configuration for the connection with the mobile device 50 and the base station 20 sends an updated DRX configuration to the mobile device 50 (event 1). The updated configuration could be sent in a RRC message, such as a RCR message, or in a control message sent according to the MAC protocol. The mobile device 50 receives the updated DRX configuration and sends an Acknowledgement (ACK) to the base station 20 on the PUCCH (event 2). In this example, the ACK is sent four subframes following the receipt of the control message containing the updated DRX configuration. In contrast to the prior art, the mobile device 50 does not immediately apply the updated DRX configuration. Rather, the mobile device 50 continues to use the current DRX configuration after receiving the updated DRX configuration until the first subframe of the next DRX on duration according to the current DRX configuration. The mobile device 50 applies the new DRX configuration at the first subframe of the next DRX on duration according to the current DRX configuration (event 3). If the updated configuration is received in a RCR message, after applying the updated DRX configuration, the mobile device 50 sends the RCRC message as previously described to notify the RRC peer in the base station 20 of the successful update. On the network side, the base station 20 receives the ACK from the mobile device 50 and also applies the updated DRX configuration at the first subframe of the next DRX on duration according to the current DRX configuration. In the case where the updated configuration is contained in an RCR message, the base station 20 does not wait for the RCRC message to apply the changes. Upon receipt of the RCRC message, the MAC layer in the base station 20 delivers the RCRC message to the RRC layer and sends an RLC ACK to the mobile device 50.

In some scenarios, it could be advantageous to use different configuration DRX cycles depending on whether a Time Alignment Timer (TAT) is not running, i.e. depending on whether the mobile device 50 is in-sync or out-of-sync. In this case, a first DRX configuration having a first DRX cycle is used when the TAT is running and a second DRX configuration with a different DRX cycle is used when the TAT is not running. U.S. Provisional Application No. 62/079,039 describes use of different DRX cycle depending on whether the TAT timer is running, This application is incorporated herein in its entirety by reference.

Figure 7:
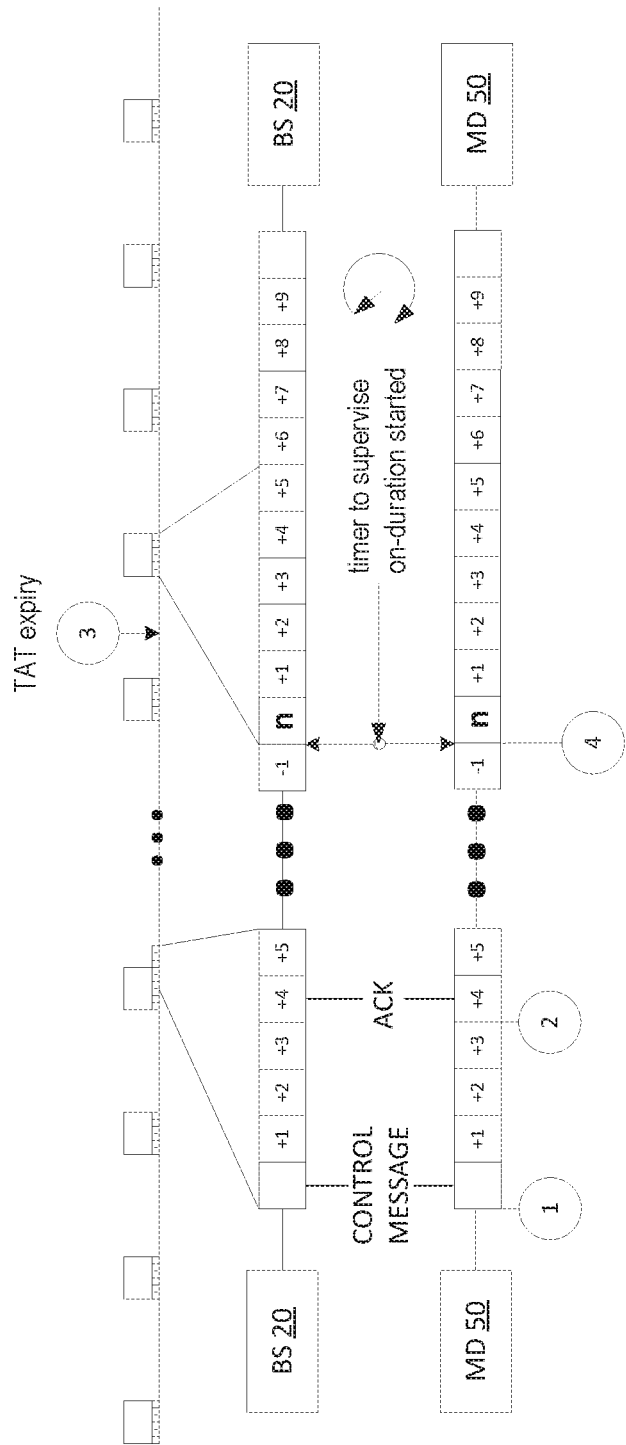
FIG. 7 is a timing diagram illustrating an exemplary method for changing DRX parameters according to a second embodiment.

FIG. 7 is a timing diagram illustrating a second exemplary method for changing DRX parameters. This method may be used, for example, when different DRX configurations are used depending on whether the TAT is running. It is assumed that the mobile device 50 has previously received a control message containing a DRX configuration for use by the mobile device 50. It is further assumed that the mobile device 50 is time-synchronized with the base station 20 and that the TAT at the mobile device 50 is running. At some point, the network 10 decides to update the DRX configuration for the connection with the mobile device 50 and the base station 20 sends an updated DRX configuration to the mobile device 50 (event 1). The updated configuration could be sent in a RRC message, such as a RCR message, or in a control message sent according to the MAC protocol. The mobile device 50 receives the updated DRX configuration and sends an Acknowledgement (ACK) to the base station 20 on the PUCCH as previously described (event 2). In contrast to the prior art, the mobile device 50 does not immediately apply the updated DRX configuration. Rather, the mobile device 50 continues to use the current DRX configuration after receiving the updated DRX configuration until after the expiration of the TAT (event 3). When the TAT expires, the mobile device 50 applies the new DRX configuration at the first subframe of the next DRX on duration according to the current DRX configuration following the expiration of the TAT (event 4). If the updated configuration is received in a RCR message, after applying the updated DRX configuration, the mobile device 50 sends the RCRC message as previously described to notify the RRC peer in the base station 20 of the successful update. On the network side, the base station 20 receives the ACK from the mobile device 50 and also applies the updated DRX configuration at the first subframe of the next DRX on duration according to the current DRX configuration following expiration of the TAT timer, In the case where the updated configuration is contained in an RCR message, the base station 20 does not wait for the RCRC message to apply the changes. Upon receipt of the RCRC message, the MAC layer in the base station 20 delivers the RCRC message to the RRC layer and sends an RLC ACK to the mobile device 50.

Figure 8:
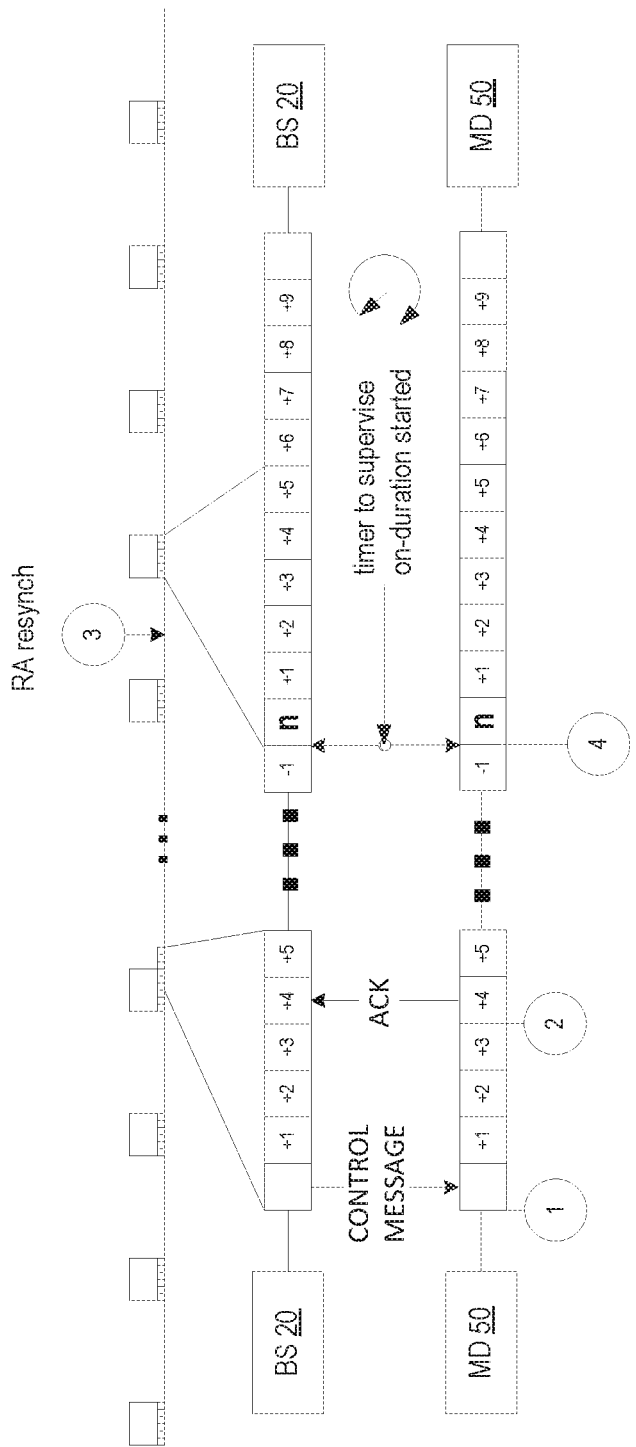
FIG. 8 is a timing diagram illustrating an exemplary method for changing DRX parameters according to a third embodiment.

FIG. 8 is a timing diagram illustrating a third exemplary method for changing DRX parameters. This method may be used, for example, when different DRX configurations with different DRX cycles are used depending on whether the TAT is running. It is assumed that the mobile device 50 has previously received a control message containing a DRX configuration for use by the mobile device 50. It is further assumed that the mobile device 50 is not synchronized with the base station 20 and that the TAT at the mobile device 50 is not running. At some point, the network 10 decides to update the DRX configuration for the connection with the mobile device 50 and the base station 20 sends an updated DRX configuration to the mobile device 50 (event 1). The updated configuration could be sent in a RRC message, such as a RCR message, or in a control message sent according to the MAC protocol. The mobile device 50 receives the updated DRX configuration and sends an Acknowledgement (ACK) to the base station 20 on the PUCCH as previously described (event 2). In contrast to the prior art, the mobile device 50 does not immediately apply the updated DRX configuration. Rather, the mobile device 50 continues to use the current DRX configuration after receiving the updated DRX configuration until the mobile device 50 successfully synchronizes with the base station 20 during a subsequent random access (RA) procedure (event 3). When the mobile device 50 has successfully synchronized with the base station 20, the mobile device 50 applies the new DRX configuration at the first subframe of the next DRX on duration according to the current DRX configuration following successful synchronization (event 4). If the updated configuration is received in a RCR message, after applying the updated DRX configuration, the mobile device 50 sends the RCRC message as previously described to notify the RRC peer in the base station 20 of the successful update. On the network side, the base station 20 receives the ACK from the mobile device 50 and also applies the updated DRX configuration at the first subframe of the next DRX on duration according to the current DRX configuration following successful synchronization of the mobile device 50 in a random access procedure. In the case where the updated configuration is contained in an RCR message, the base station 20 does not wait for the RCRC message to apply the changes. Upon receipt of the RCRC message, the data layer in the base station 20 delivers the RCRC message to the RRC layer and sends an RLC ACK to the mobile device 50.

Figure 9:
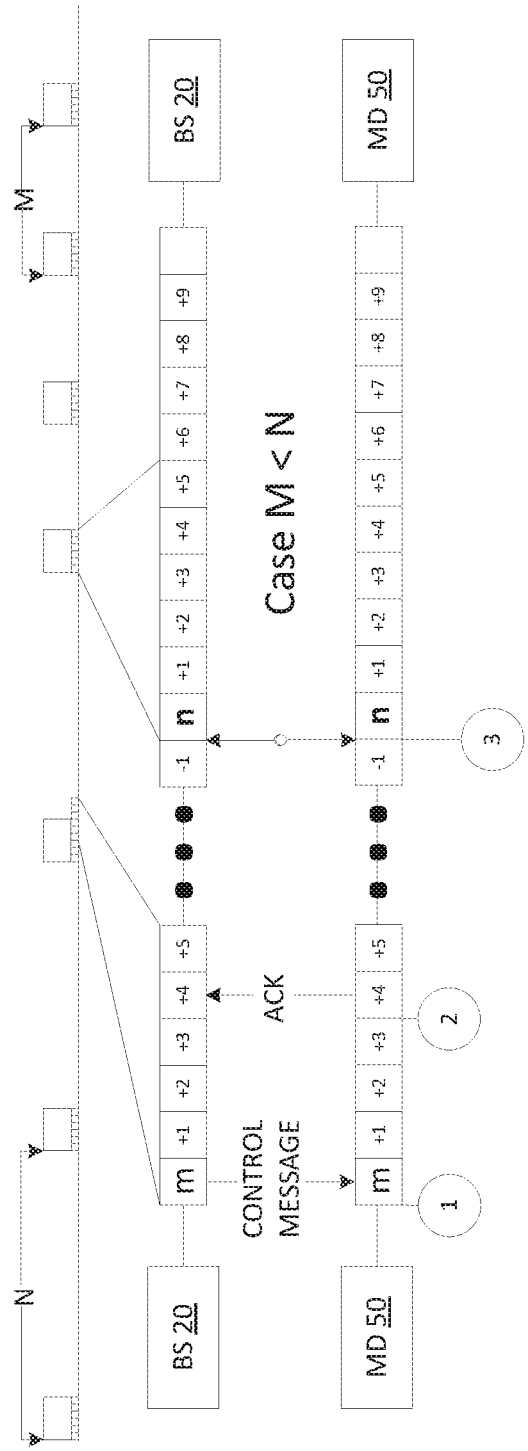
FIG. 9 is a timing diagram illustrating an exemplary method for changing DRX parameters according to a fourth embodiment.
Figure 10:
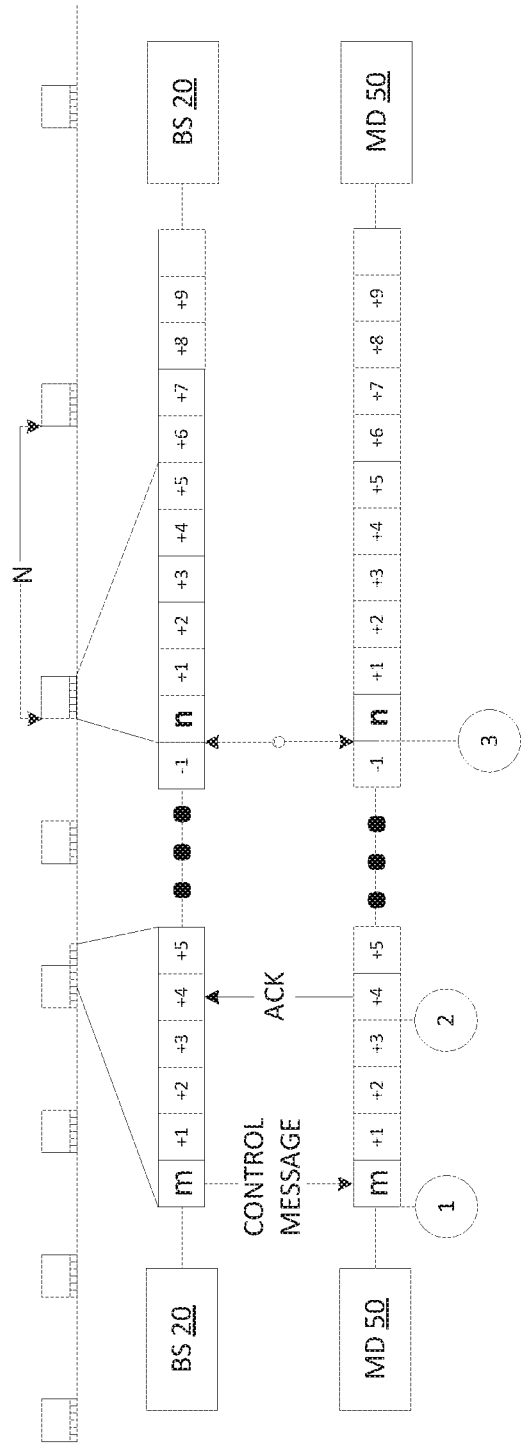
FIG. 10 is a timing diagram illustrating an exemplary method for changing DRX parameters according to a fifth embodiment.

A change in the DRX configuration may include a change in the length of the DRX cycle. Change in the length of the DRX cycle may occur, for example, when adding a new bearer that has a different Quality of Service (QoS) requirement. In this case, the connection may be configured with a service-specific DRX configuration. For example, in the case of a new bearer being added for a voice conversation in which a shorter DRX cycle is preferable, the length of the DRX cycle may be reduced from N to M where M<N as shown in FIG. 9. When the voice bearer is released, the mobile device may revert back to the previous DRX configuration as shown in FIG. 10. In the examples shown in FIGS. 9 and 10, the mobile device 50 receives a control message containing the updated DRX configuration (event 1), sends an ACK to acknowledge the control message four subframes later (event 2), and then applies the updated DRX configuration at the first subframe of the next DRX on duration according to the current DRX configuration (event 3). In other embodiments, the mobile device 50 could wait for the expiration of a TAT if the mobile device 50 is time synchronized with the base station 20, or until it synchronizes with the base station 20 as part of a RA procedure if the mobile device is out-of-sync.

When the DRX configuration is changed, the mobile device 50 may need to recalculate a new DRX start offset for the recurring DRX on duration, i.e. the on duration phase. In the case where the length of the DRX cycle is changed from N to M as shown in FIG. 9, the new DRX start offset, denoted $\text{drxStartOffset}_M$ may be computed according to:

$$\text{drxStartOffset}_M = \text{drxStartOffset}_N \bmod M = \text{remainder} (\text{drxStartOffset}_N/M) \quad \text{(Eq. 1)}$$

where drxStartOffset$_N$ is the current DRX start offset. When the mobile device 50 reverts back from M to N as shown in FIG. 10, the mobile device 50 reverts back to drxStartOffset$_N$.

Figure 11:
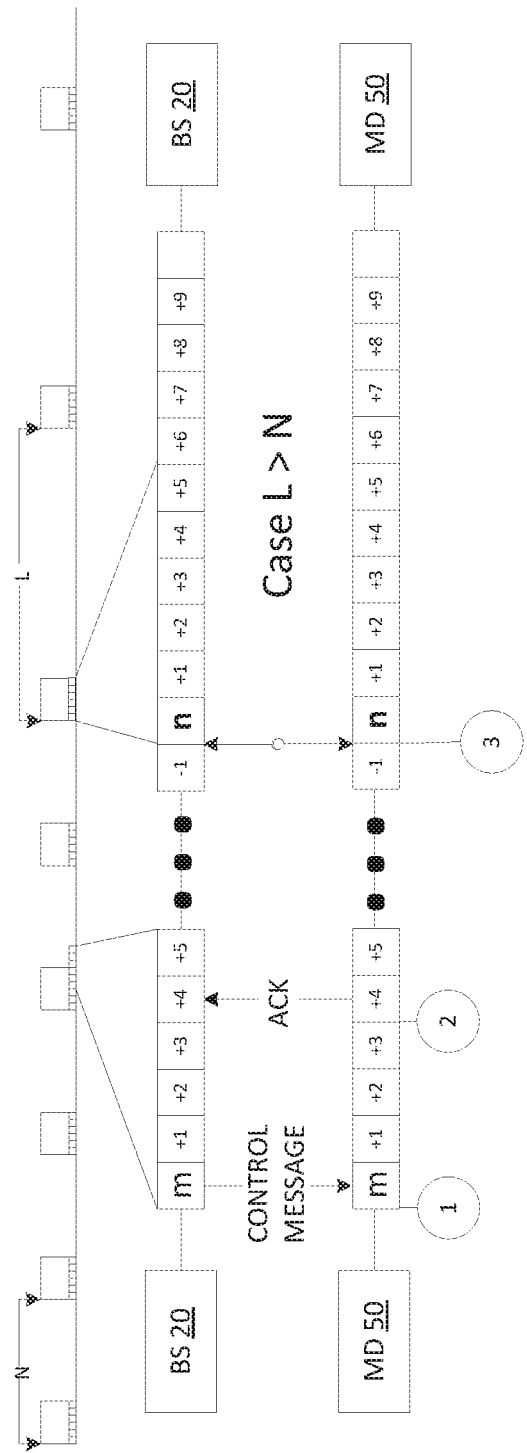
FIG. 11 is a timing diagram illustrating an exemplary method for changing DRX parameters according to a sixth embodiment.

Another example is when the network 10 decides to change the DRX configuration based on the application activity as detected by the mobile device 50, which may require a lower duty cycle to conserve battery power. In this case, the length of the DRX cycle may be increased from N to L where L>N as shown in FIG. 11. As previously described, the mobile device 50 receives a control message containing the updated DRX configuration (event 1), sends an ACK to acknowledge the control message four subframes later (event 2), and then applies the updated DRX configuration at the first subframe of the next DRX on duration according to the current DRX configuration (event 3). In other embodiments, the mobile device 50 could wait for the expiration of a TAT if the mobile device 50 is time synchronized with the base station 20, or until it synchronizes with the base station 20 as part of a RA procedure if the mobile device 50 is out-of-sync. In the case where the length of the DRX cycle is changed from N to L as shown in FIG. 11, and assuming that L is a multiple of N, the mobile device 50 may continue to use the previous DRX start offset. That is, there is no need to change the DRX start offset where L is a multiple of N.

Figure 12:
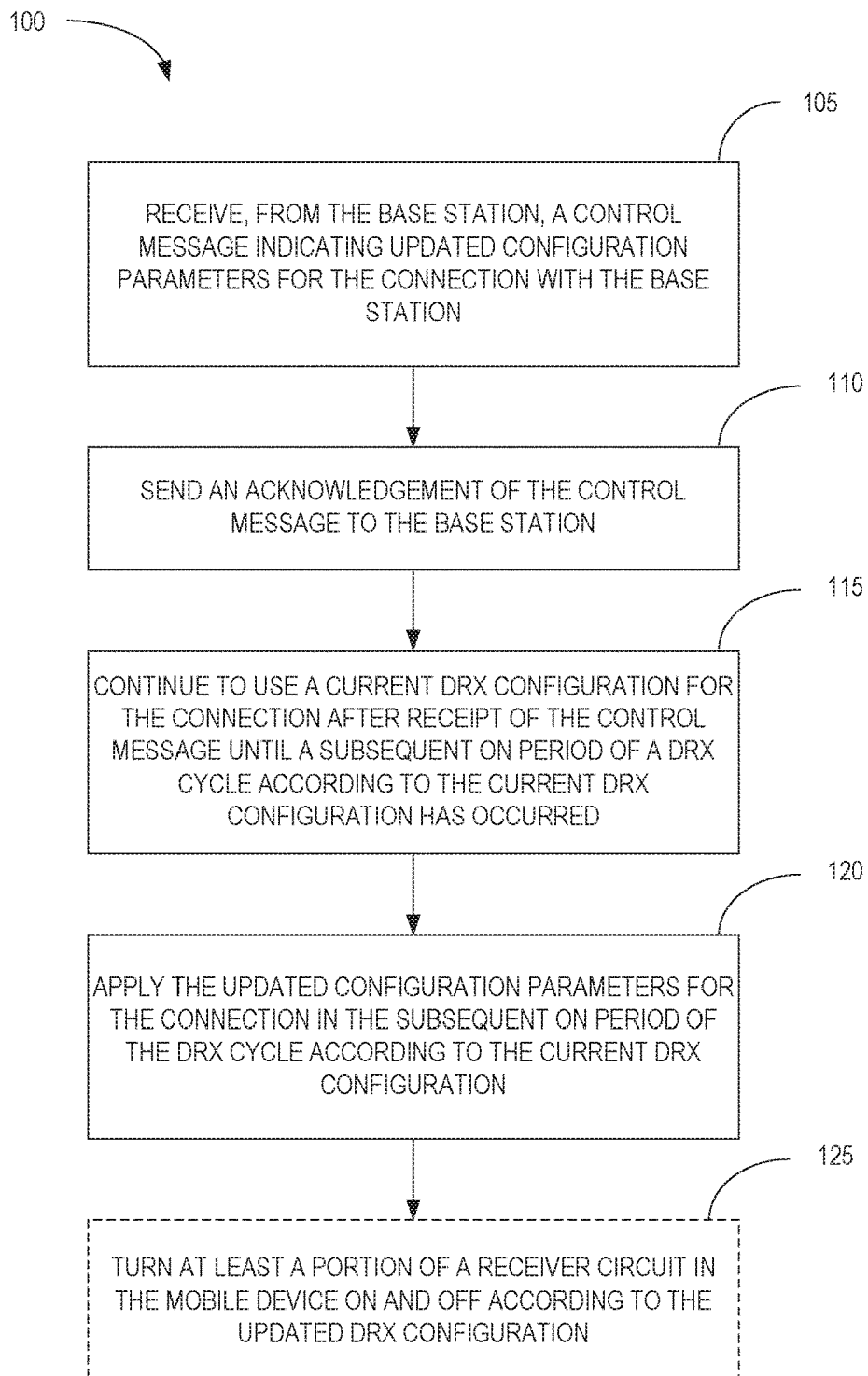
FIG. 12 illustrates an exemplary method implemented by a mobile device for changing a DRX configuration for a connection with the base station.

FIG. 12 illustrates an exemplary method 100 implemented by a mobile device 50 of changing the discontinuous reception (DRX) configuration for a connection between a mobile device and a base station. It is assumed that the mobile device 50 has previously received a control message containing a DRX configuration for use by the mobile device 50. The method begins when the mobile device 50 receives, from the base station 20, a control message indicating updated configuration parameters for the connection with the base station 20 (block 105). The control message is received at a time when the mobile device 50 has its receiver turned on, e.g., during an on duration of a DRX cycle according to a current DRX configuration or when the DIAT is running. Responsive to the receipt of the control message, the mobile device 50 sends an acknowledgement of the control message to the base station 20 (block 110). The mobile device 50 continues using the current DRX configuration for the connection after receipt of the updated configuration parameters until a subsequent on duration of the DRX cycle according to the current DRX configuration has occurred (block 115). The mobile device 50 applies the updated configuration parameters for the connection in the subsequent on duration of the DRX cycle (block 120). In some embodiments, the method further comprises turning at least a portion of a receiver circuit in the mobile device 50 on and off according to the updated DRX configuration (block 125).

In one embodiment, the mobile device 50 applies the updated configuration parameters at the first subframe of the next on duration according to the current DRX configuration. In other embodiments, the mobile device 50 waits for the occurrence of a predetermined event and then applies the updated configuration parameters at the first subframe of the next on duration according to the current DRX configuration after the predetermined event. The predetermined event may, for example, comprise the expiration of a Time Alignment Timer (TAT) if the mobile device 50 is synchronized with the base station 20. The predetermined event may also comprise a successful resynchronization by random access if the mobile device 50 is not synchronized with the base station 20.

In some embodiments of the method shown in FIG. 12, the length of the DRX cycle according to the updated configuration parameters is different from the length of the DRX cycle according to the current DRX configuration. In this case, the method further comprises computing a new DRX start offset for the updated DRX configuration as a function of a current DRX start offset for the current DRX configuration. In some embodiments, where the length of the DRX cycle according to the updated configuration parameters is shorter than the length of the DRX cycle according to the current DRX configuration, a new DRX start offset is computed according to Equation 1.

Figure 13:
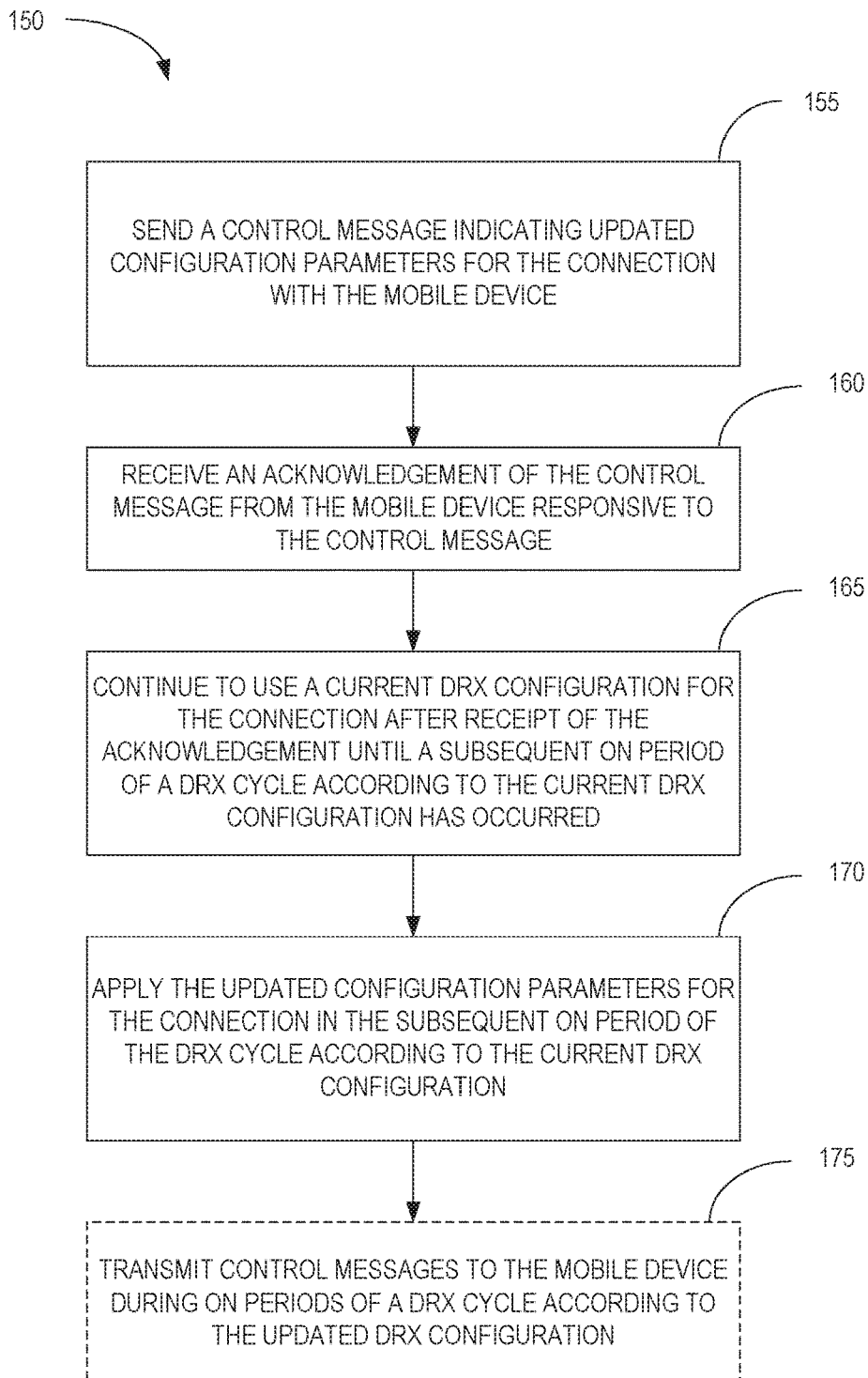
FIG. 13 illustrates an exemplary method implemented by a base station for changing a DRX configuration for a connection with a mobile device.

FIG. 13 illustrates an exemplary method 150 implemented by a base station 20 of changing the discontinuous reception (DRX) configuration for a connection between a mobile device 50 and the base station 20. It is assumed that the mobile device 50 is already configured for DRX operation. The method begins when the base station 20 sends to the mobile device 50 a control message indicating updated configuration parameters, i.e., DRX parameters, for the connection with the base station 20 (block 155). The control message is sent at a time when the mobile device 50 has its receiver turned on, e.g., during an on duration of a DRX cycle according to a current DRX configuration or when the DIAT is running. The base station 20 subsequently receives an acknowledgement of the control message sent by the mobile device 50 to the base station 20 responsive to the control message (block 160). The base station 20 continues using the current DRX configuration for the connection after sending the control message until a subsequent on duration of the DRX cycle according to the current DRX configuration has occurred (block 165). The base station 20 applies the updated configuration parameters for the connection in the subsequent on duration of the DRX cycle (block 170), In some embodiments, the method further comprises transmitting control message to the mobile device 50 during on durations of a DRX cycle according to the updated DRX configuration (block 175).

In one embodiment, the base station 20 applies the updated configuration parameters at the first subframe of the next on duration according to the current DRX configuration. In other embodiments, the base station 20 waits for the occurrence of a predetermined event and then applies the updated configuration parameters at the first subframe of the next on duration according to the current DRX configuration after the predetermined event. The predetermined event may, for example, comprise the expiration of a Time Alignment Timer (TAT) if the mobile device 50 is synchronized with the base station 20. The predetermined event may also comprise a successful resynchronization by random access if the mobile device 50 is not synchronized with the base station 20.

In some embodiments of the method shown in FIG. 13, the length of the DRX cycle according to the updated configuration parameters is different from the length of the DRX cycle according to the current DRX configuration. In this case, the method further comprises computing a new DRX start offset for the updated DRX configuration as a function of a current DRX start offset for the current DRX configuration. In some embodiments, where the length of the DRX cycle according to the updated configuration parameters is shorter than the length of the DRX cycle according to the current DRX configuration, the a new DRX start offset is computed according to Equation 1.

Figure 14:
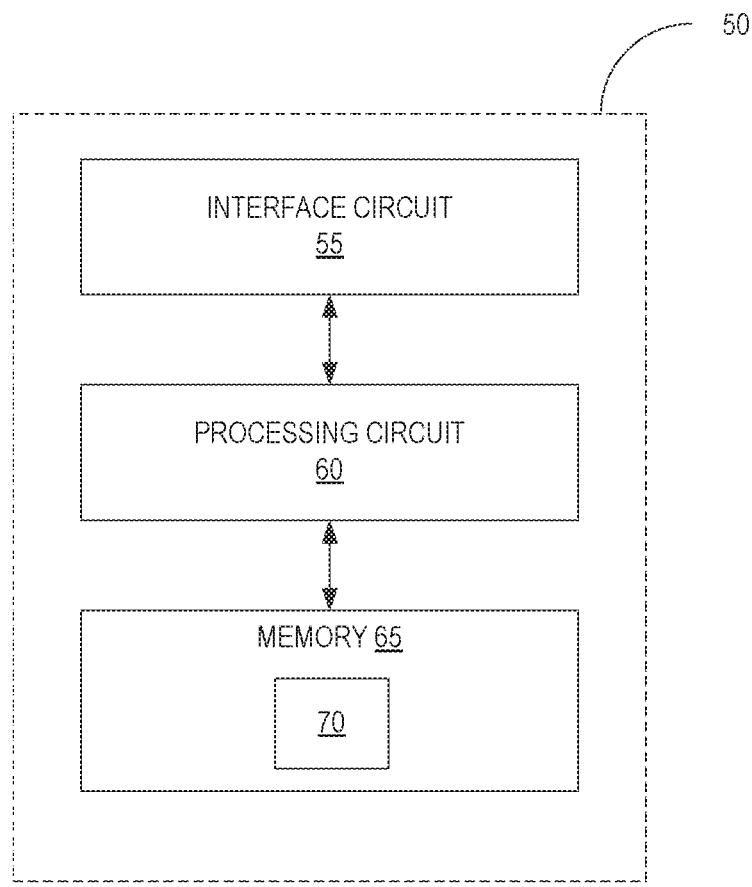
FIG. 14 illustrates an exemplary mobile device configured to implement the methods herein described for changing DRX configuration.

FIG. 14 illustrates an exemplary mobile device 50 configured to implement DRX as herein described. The mobile device 50 comprises an interface circuit 55 for communicating with a serving base station 20 over a wireless communication channel, a processing circuit 60 to control the overall operation of the mobile device 50 and process data transmitted and received by the mobile device 50, and memory 65 to store program instructions and data needed by the processing circuit 60. The interface circuit 55 may for example comprise a cellular transceiver circuit including transmitter and receiver circuits. The transceiver circuit may be configured according to any known standard. In one embodiment, the transceiver circuit is configured to operate according to the LTE standard. The transceiver circuit could also be configured to operate according to the WCDMA, WiMAX, and WLAN standards. The processing circuit 60 comprises one or more microprocessors, hardware, firmware or a combination thereof. The functions performed by the processing circuit 60 include configuring DRX parameters for DRX mode as herein described. Memory 65 stores program instructions and data used by the processing circuit 60 for operation. The memory 65 includes non-volatile memory such as read-only memory (ROM) or flash memory for storing program instructions and permanent data. Memory 65 may further include random access memory (RAM) or other volatile memory for storing temporary data generated during operation, Memory 65 may be implemented by one or more discrete memory devices or may be integrated into a microprocessor or microcontroller in the processing circuit 60. In one embodiment, memory 65 comprises a non-transitory computer readable medium storing executable program code 70 that when executed by the processing circuit 60 in the mobile device 50 causes the mobile device 50 to perform the method shown in FIG. 12.

Figure 15:
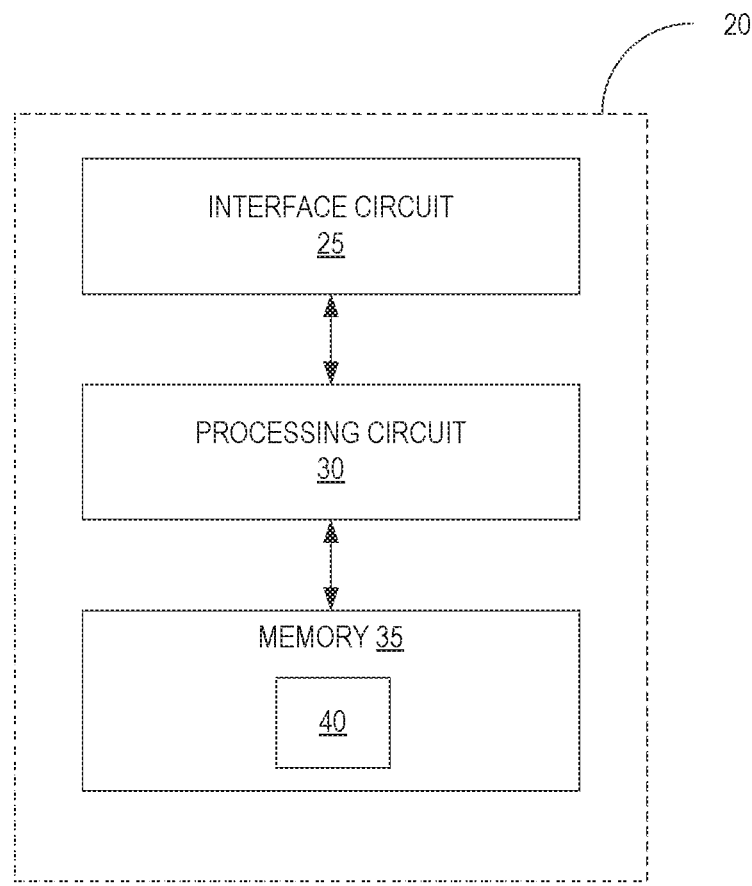
FIG. 15 illustrates an exemplary base station configured to implement the methods herein described for changing DRX configuration.

FIG. 15 illustrates the main functional components of an exemplary base station 20. The base station 20 comprises an interface circuit 25 for communicating with mobile devices 50 over a wireless communication channel, a processing circuit 30 to control the overall operation of the base station 20 and process data transmitted and received by the base station 20, and memory 35 to store program instructions and data needed by the processing circuit 30. The interface circuit 25 may for example comprise a cellular transceiver circuit including transmitter and receiver circuits. The transceiver circuit may be configured according to any known standard. In one embodiment, the transceiver circuit is configured to operate according to the LTE standard. The transceiver circuit could also be configured to operate according to the WCDMA, WiMAX, and WLAN (Wireless Local Area Network) standards. The processing circuit 30 comprises one or more microprocessors, hardware, firmware or a combination thereof. The functions performed by the processing circuit 30 include configuring DRX parameters for DRX mode as herein described. Memory 35 stores program instructions and data used by the processing circuit 30 for operation. The memory 35 includes non-volatile memory such as read-only memory (ROM) or flash memory for storing program instructions and permanent data. Memory 35 may further include random access memory (RAM) or other volatile memory for storing temporary data generated during operation. Memory 35 may be implemented by one or more discrete memory devices or may be integrated into a microprocessor or microcontroller in the processing circuit 30. In one embodiment, memory 35 comprises a non-transitory computer readable medium storing executable program code 40 that when executed by the processing circuit 30 in the base station 20 causes the base station 20 to perform the method shown in FIG. 13.

Using the techniques herein described, the sequence to change DRX configuration is likelier to end successfully, thereby decreasing the number of dropped connections. Reducing dropped connections will be advantageous to Quality of Experience (QoE) values expected by the mobile device users and also to the Key Performance Values (KPVs) as monitored continuously by the network operator. The KPV gains may be reflected in metrics and formulas used for retainability (dropped connections) and also for accessibility because the techniques will decrease the amount of signaling used to re-establish connections.

The MAC peers will use the same timers and parameters for DRX. If by chance the DIAT expires some time during the execution of the sequence, the MAC peers in the mobile device 50 and base station 20 will both understand that the active time has ended and when it will reoccur. The connection between the base station 20 and mobile device 50 will remain intact and the base station 20 can focus its limited transmission attempts to situations when mobile device 50 is actively receiving PDCCH.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method, implemented by a mobile device, of changing the discontinuous reception (DRX) configuration for a connection between a mobile device and a base station, the method comprising:
   receiving, from the base station, a control message indicating updated configuration parameters for the connection with the base station;
   sending, by the mobile device, an acknowledgement of the control message;
   continuing to use a current DRX configuration for the connection after receipt of the control message until a subsequent on duration of a DRX cycle according to the current DRX configuration has occurred, wherein length of the DRX cycle according to the updated configuration parameters is different from length of the DRX cycle according to the current DRX configuration;
   computing a new DRX start offset for the updated DRX configuration as a function of a current DRX start offset for the current DRX configuration;
   applying the updated configuration parameters for the connection in the subsequent on duration of the DRX cycle.

2. The method of claim 1, wherein continuing to use the previous configuration parameters for the connection after receipt of the updated configuration parameters comprises continuing to use the current configuration parameters until the first subframe in the next on duration of the DRX cycle following receipt of the control message.

3. The method of claim 1, wherein continuing to use the previous configuration parameters for the connection after receipt of the updated configuration parameters comprises:
   waiting for the expiration of a time alignment timer;
   continuing to use the current configuration parameters until the first subframe in the next on duration of the DRX cycle following the expiration of the time alignment timer.

4. The method of claim 1, wherein continuing to use the previous configuration parameters for the connection after receipt of the updated configuration parameters comprises:

resynchronizing with the base station as part of a random access procedure;

continuing to use the current configuration parameters until the first subframe in the next on duration of the DRX cycle following resynchronization.

5. The method of claim 1:
wherein the length of the DRX cycle according to the updated configuration parameters is shorter than the length of the DRX cycle according to the current DRX configuration;
wherein computing a new DRX start offset comprises computing the new DRX start offset according to drxStartOffsetM=drxStartOffsetN mod M= remainder (drxStartOffsetN/M), where N is the current DRX start offset and M is the new DRX start offset.

6. The method of claim 1, further comprising turning at least a portion of a receiver circuit in the mobile device on an off according to the updated DRX configuration.

7. A mobile device, comprising:
an interface circuit including a receiver for communicating with a serving base station over a wireless communication channel;
a processing circuit operatively connected to the interface circuit, the processing circuit configured to:
receive, from the base station, a control message indicating updated configuration parameters for the connection with the base station;
send, by the mobile device, an acknowledgement of the control message;
continue to use the a current DRX configuration for the connection after receipt of the control message until a subsequent on duration of a DRX cycle according to the current DRX configuration has occurred, wherein the length of the DRX cycle according to the updated configuration parameters is different from the length of the DRX cycle according to the current DRX configuration;
compute a new DRX start offset for the updated DRX configuration as a function of a current DRX start offset for the current DRX configuration;
apply the updated configuration parameters for the connection in the subsequent on duration of the DRX cycle.

8. The mobile device of claim 7, wherein the processing circuit is further configured to continue to use the current configuration parameters until the first subframe in the next on duration of the DRX cycle following receipt of the control message.

9. The mobile device of claim 7, wherein the processing circuit is further configured continuing to:
wait for the expiration of a time alignment timer;
continue to use the previous configuration parameters until the first subframe in the next on duration of the DRX cycle following the expiration of the time alignment timer.

10. The mobile device of claim 7, wherein the processing circuit is further configured continuing to:
resynchronize with the base station as part of a random access procedure;
continue to use the current configuration parameters until the first subframe in the next on duration of the DRX cycle following resynchronization.

11. The mobile device of claim 7:
wherein the length of the DRX cycle according to the updated configuration parameters is shorter than the length of the DRX cycle according to the current DRX configuration;
wherein the processing circuit is further configured continuing to compute a new DRX start offset according to drxStartOffsetM=drxStartOffsetN mod M= remainder (drxStartOffsetN/M), where N is the current DRX start offset and M is the new DRX start offset.

12. The mobile device of claim 7, wherein the processing circuit is further configured to turn at least a portion of a receiver circuit in the mobile device on an off according to the updated DRX configuration.

13. A method, implemented by a base station, of changing the discontinuous reception (DRX) configuration for a connection between a mobile device and the base station, the method comprising:
sending a control message indicating updated configuration parameters for the connection with the mobile device;
receiving, by the base station, an acknowledgement of the control message from the mobile device responsive to the control message;
continuing to use a current DRX configuration for the connection after receipt of the acknowledgement until a subsequent on duration of a DRX cycle according to the current DRX configuration has occurred, wherein the length of the DRX cycle according to the updated configuration parameters is different from the length of the DRX cycle according to the current DRX configuration;
computing a new DRX start offset for the updated DRX configuration as a function of a current DRX start offset for the current DRX configuration; and
applying the updated configuration parameters for the connection in the subsequent on duration of the DRX cycle.

14. The method of claim 13, wherein continuing to use the previous configuration parameters for the connection after receipt of the updated configuration parameters comprises continuing to use the current configuration parameters until the first subframe in the next on duration of the DRX cycle following receipt of the control message.

15. The method of claim 13, wherein continuing to use the previous configuration parameters for the connection after receipt of the updated configuration parameters comprises:
waiting for the expiration of a time alignment timer;
continuing to use the current configuration parameters until the first subframe in the next on duration of the DRX cycle following the expiration of the time alignment timer.

16. The method of claim 13, wherein continuing to use the previous configuration parameters for the connection after receipt of the updated configuration parameters comprises:
resynchronizing with the mobile device as part of a random access procedure;
continuing to use the current configuration parameters until the first subframe in the next on duration of the DRX cycle following resynchronization.

17. The method of claim 13:
wherein the length of the DRX cycle according to the updated configuration parameters is shorter than the length of the DRX cycle according to the current DRX configuration;
wherein computing a new DRX start offset comprises computing the new DRX start offset according to drxStartOffsetM=drxStartOffsetN mod M= remainder (drxStartOffsetN/M), where N is the current DRX start offset and M is the new DRX start offset.

18. The method of claim 13, further comprising transmitting control messages to the mobile device during on durations of a DRX cycle according to the updated DRX configuration.

19. A base station, comprising:
an interface circuit for communicating with a mobile device over a wireless communication channel;
a processing circuit operatively connected to the interface circuit, the processing circuit configured to:
send a control message indicating updated configuration parameters for the connection with the mobile device;
receive an acknowledgement of the control message from the mobile device responsive to the control message;
continue to use a current DRX configuration for the connection after receipt of the acknowledgement until a subsequent on duration of a DRX cycle according to the current DRX configuration has occurred, wherein the length of the DRX cycle according to the updated configuration parameters is different from the length of the DRX cycle according to the current DRX configuration;
compute a new DRX start offset for the updated DRX configuration as a function of a current DRX start offset for the current DRX configuration; and
apply the updated configuration parameters for the connection in the subsequent on duration of the DRX cycle.

20. The base station of claim 19, wherein continuing to use the current configuration parameters for the connection after receipt of the updated configuration parameters comprises continuing to use the previous configuration parameters until the first subframe in the next on duration of the DRX cycle following receipt of the control message.

21. The base station of claim 19, wherein continuing to use the previous configuration parameters for the connection after receipt of the updated configuration parameters comprises:
waiting for the expiration of a time alignment timer;
continuing to use the current configuration parameters until the first subframe in the next on duration of the DRX cycle following the expiration of the time alignment timer.

22. The base station of claim 19, wherein continuing to use the current configuration parameters for the connection after receipt of the updated configuration parameters comprises:
resynchronizing with the mobile device as part of a random access procedure;
continuing to use the current configuration parameters until the first subframe in the next on duration of the DRX cycle following resynchronization.

23. The base station of claim 19:
wherein the length of the DRX cycle according to the updated configuration parameters is shorter than the length of the DRX cycle according to the current DRX configuration;
wherein computing a new DRX start offset comprises computing the new DRX start offset according to drxStartOffsetM=drxStartOffsetN mod M= remainder (drxStartOffsetN/M), where N is the current DRX start offset and M is the new DRX start offset.

24. The base station of claim 19, wherein the processing circuit is configured to transmit, via the interface circuit, control messages to the mobile device during on durations of a DRX cycle according to the updated DRX configuration.

25. A non-transitory computer readable medium storing executable program code that, when executed by a processing circuit in a mobile device, causes the mobile device to:
receive, from the base station, a control message indicating updated configuration parameters for the connection with the base station;
send an acknowledgement of the control message;
continue using a current DRX configuration for the connection after receipt of the control message until a subsequent on duration of a DRX cycle according to the current DRX configuration has occurred, wherein the length of the DRX cycle according to the updated configuration parameters is different from the length of the DRX cycle according to the current DRX configuration;
compute a new DRX start offset for the updated DRX configuration as a function of a current DRX start offset for the current DRX configuration; and
apply the updated configuration parameters for the connection in the subsequent on duration of the DRX cycle.

26. A non-transitory computer readable medium storing executable program code that, when executed by a processing circuit in a base station, causes the base station to:
send a control message indicating updated configuration parameters for the connection with the mobile device;
receive an acknowledgement of the control message from the mobile device responsive to the control message;
continue using a current DRX configuration for the connection after receipt of the acknowledgment until a subsequent on duration of the DRX cycle according to the current DRX configuration has occurred, wherein the length of the DRX cycle according to the updated configuration parameters is different from the length of the DRX cycle according to the current DRX configuration;
compute a new DRX start offset for the updated DRX configuration as a function of a current DRX start offset for the current DRX configuration; and
apply the updated configuration parameters for the connection in the subsequent on duration of the DRX cycle.

* * * * *